(12) United States Patent
Wang

(10) Patent No.: US 8,109,030 B2
(45) Date of Patent: Feb. 7, 2012

(54) AIMING DEVICE

(75) Inventor: Min-Hung Wang, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 351 days.

(21) Appl. No.: 12/436,860

(22) Filed: May 7, 2009

(65) Prior Publication Data

US 2010/0101133 A1 Apr. 29, 2010

(30) Foreign Application Priority Data

Oct. 23, 2008 (TW) ................................ 97140609 A

(51) Int. Cl.
*F41G 1/38* (2006.01)
(52) U.S. Cl. ................. 42/122; 42/126; 42/130; 42/137
(58) Field of Classification Search ............... 42/111, 42/122, 124, 126, 130, 135, 137; 356/251, 356/252

See application file for complete search history.

(56) References Cited

U.S. PATENT DOCUMENTS

| | | | | |
|---|---|---|---|---|
| 3,645,635 | A | * | 2/1972 | Steck .............................. 356/252 |
| 3,826,012 | A | * | 7/1974 | Pachmayr ........................ 42/122 |
| 4,200,355 | A | * | 4/1980 | Williams, Jr. .................. 359/424 |
| 5,086,566 | A | * | 2/1992 | Klumpp ........................... 42/126 |
| 6,172,821 | B1 | * | 1/2001 | Isbell et al. .................... 359/809 |
| 7,350,329 | B1 | * | 4/2008 | Bell et al. ........................ 42/122 |
| 2006/0168871 | A1 | * | 8/2006 | Wagner ............................ 42/122 |

* cited by examiner

*Primary Examiner* — Michael Carone
*Assistant Examiner* — Samir Abdosh
(74) *Attorney, Agent, or Firm* — Thomas|Kayden

(57) ABSTRACT

An aiming device is provided. The aiming device includes an erector tube assembly, a moving plate and a crosshair. The moving plate, disposed on the erector tube assembly, is movable along a direction. The crosshair is disposed on the moving plate. When the moving plate moves, the crosshair moves with the moving plate along the direction.

9 Claims, 8 Drawing Sheets

– continued –

AIMING DEVICE

CROSS REFERENCE TO RELATED APPLICATIONS

This Application claims priority of Taiwan Patent Application No. 097140609, filed on Oct. 23, 2008, the entirety of which is incorporated by reference herein.

BACKGROUND OF THE INVENTION

1. Field of the Invention

The present invention relates to an aiming device, and in particular relates to an optical sight.

2. Description of the Related Art

The aiming device is disposed on a firearm to assist aiming of a target. FIG. 1 is cross section of a conventional aiming device 10. The conventional aiming device 10 comprises a housing 101, an objective lens assembly O1, an ocular lens assembly O2, an erector tube assembly 103 and a crosshair 105. The objective lens assembly O1 is disposed on an objective end of the housing 101 while the ocular lens assembly O2 is disposed on an ocular end of the housing 101. The erector tube assembly 103, is disposed in the housing 101 and between the objective end and the ocular end, wherein an upside down image received by the ocular lens is adjusted to a correct position. The crosshair 105 is disposed on an end of the erector tube assembly 103, which is near the ocular end of the housing 101.

FIG. 2 is a front view showing the crosshair 105 of the conventional aiming device 10. The crosshair 105 is formed by two linear lines perpendicularly intersecting with each other, of which a point of aim is formed to focus onto a target. Additionally, the crosshair 105 further comprises several dots A. When shooting at a long ranged target, the dots A may be used to assist the user to compensate for the effect of gravity on the bullet in order to precisely hit the target.

BRIEF SUMMARY OF THE INVENTION

An aiming device is provided. The aiming device comprises an erector tube assembly, a moving plate and a crosshair. The moving plate, disposed on the erector tube assembly, is movable along a direction. The crosshair is disposed on the moving plate. When the moving plate moves, the crosshair moves with the moving plate along the direction.

Another aiming device is provided. The aiming device comprises an erector tube assembly, a first moving plate, a second moving plate and a crosshair. The first moving plate, disposed on the erector tube assembly, is movable along a first direction. The second moving plate, disposed on the first moving plate, is movable along a second direction. The crosshair is disposed on the second moving plate. When the first moving plate or the second moving plate moves, the crosshair moves with the first moving plate along the first direction or moves with the second moving plate along the second direction.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figures 1, 2:
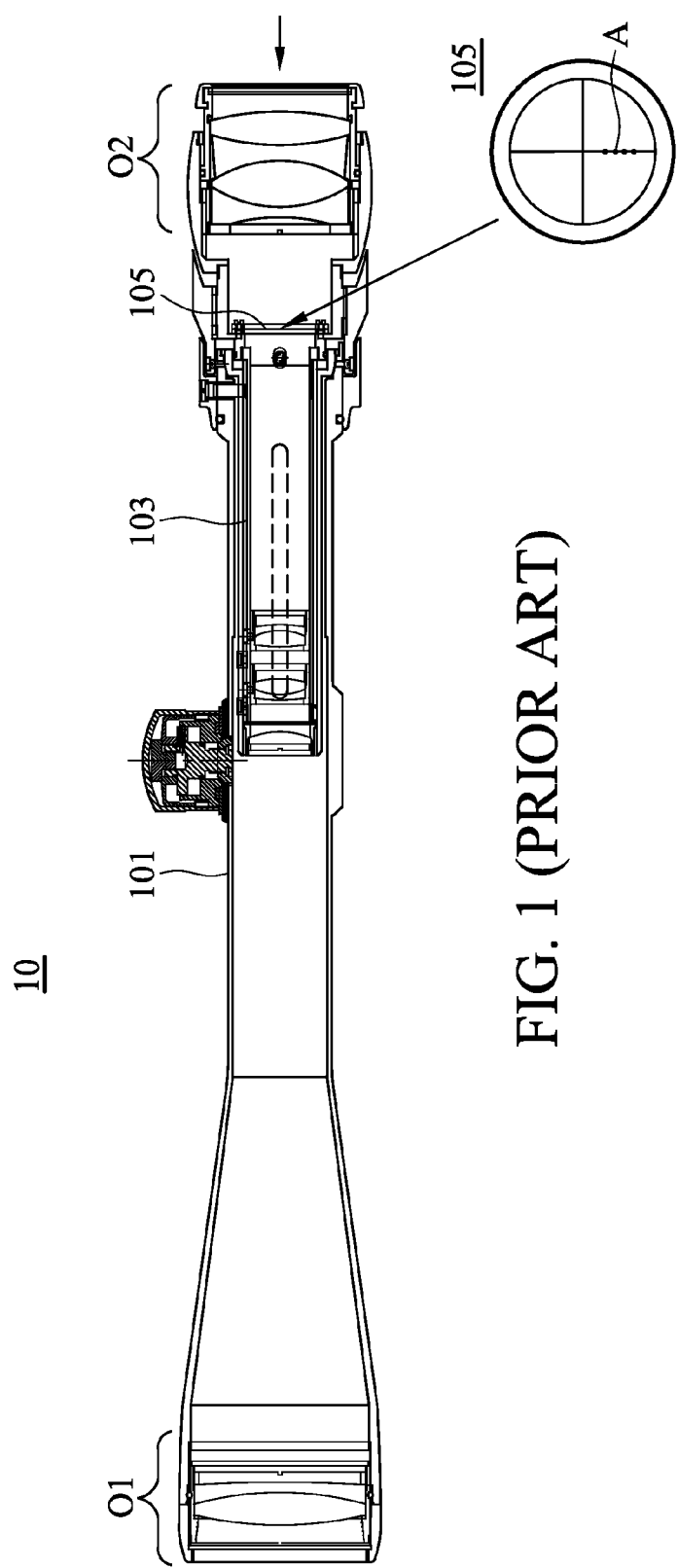
FIG. 1 is cross section of a conventional aiming device.
FIG. 2 is a front view showing a crosshair of the conventional aiming device.
Figure 3A:
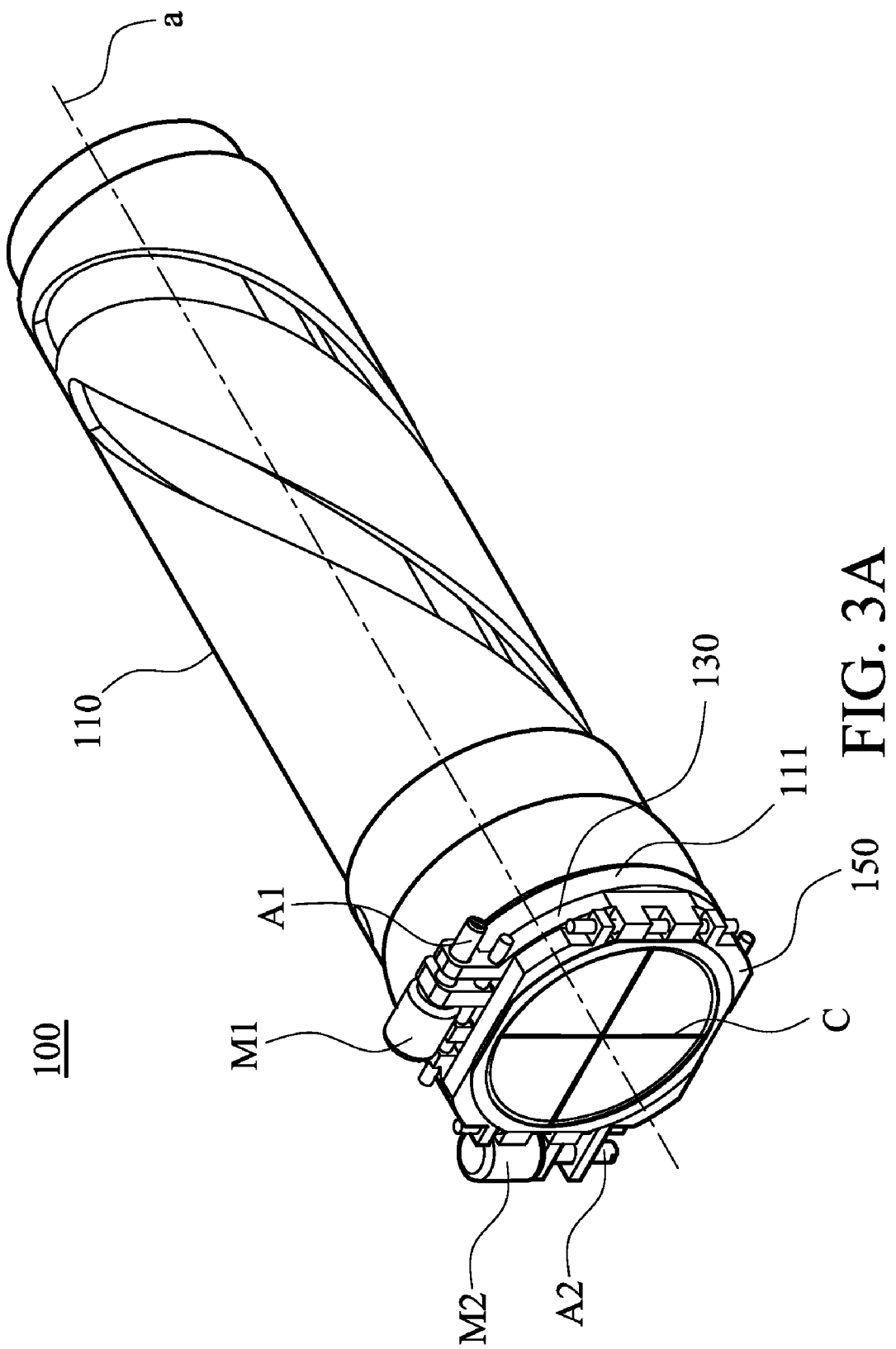
FIG. 3A is a schematic view of an aiming device of an embodiment of the invention.
Figure 3B:
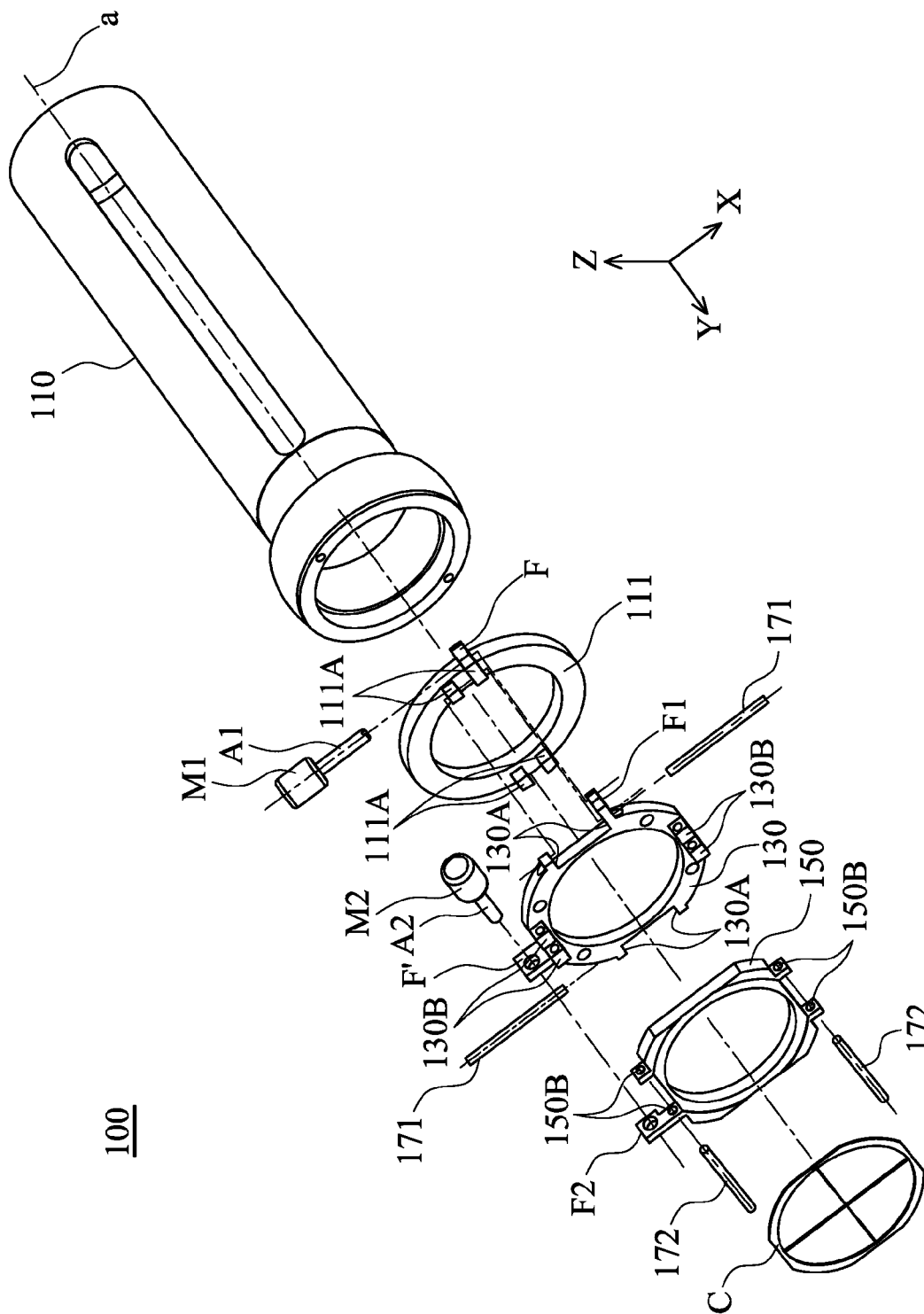
FIG. 3B is an exploded view of the aiming device in FIG. 3A.

Referring to FIGS. 3A and 3B, FIG. 3A is a schematic view of an aiming device of an embodiment of the invention, and FIG. 3B is an exploded view of the aiming device in FIG. 3A. A housing and some optical components are eliminated in FIGS. 3A and 3B for clarity.

As shown in FIG. 3A, the aiming device 100 comprises the housing (not shown), an erector tube assembly 110, a moving assembly and a crosshair C. The erector tube assembly 110, disposed in the housing, comprises a connecting base 111 connected to the moving assembly. The crosshair C is disposed on the moving assembly, and the point of aim on the crosshair C aligns with an optical axis a of the erector tube assembly 110. When the moving assembly moves relatively to the erector tube assembly 110, the point of aim on the crosshair C is off from the optical axis a.

As shown in FIG. 3B, the moving assembly comprises a first moving plate 130, a second moving plate 150, a first motor M1, a second motor M2, two first position members 171 and two second position members 172. The first motor M1 and the second motor M2 respectively comprise a first axle A1 and a second axle A2, and the first and second motors M1, M2 rotate to spin the first axle A1 and the second axle A2.

The connecting base 111 comprises a fixing portion F and a first position portion 111A. The fixing portion F has a through hole and the first position portion 111A comprises four protrusions, each with a through hole formed thereon The first moving plate 130 comprises a fixing portion F', a first connecting portion F1, a first corresponding position portion 130A and a second position portion 130B. The fixing portion F' has a through hole, and the first connecting portion F1, corresponding to the fixing portion F of the connecting base 111, also has a through hole. The first corresponding position portion 130A, corresponding to the first position portion 111A, comprises four protrusions, each with a through hole formed thereon. The second position portion 130B also comprises four protrusions, each with a through hole formed thereon.

The second moving plate 150 comprises a second connecting portion F2 and a second corresponding position portion 150B. The second connecting portion F2, corresponding to the fixing portion F' of the first moving plate 130, has a through hole. The second corresponding position portion 150B, corresponding to the second position portion 130B, comprises four protrusions, each with a through hole formed thereon.

The crosshair C is disposed on the second moving plate 150. The two second position members 172, at two sides of the second moving plate 150, respectively pass through the second corresponding position portion 150B of the second moving plate 150 and the second position portion 130B along a direction parallel to a Y-axis, and are fixed on the second position portion 130B. In other words, the second moving plate 150 is fixed on the first moving plate 130 via the second position member 172. However, the second corresponding position portion 150B is still able to move on the second position members 172, allowing the second moving plate 150 to move relatively to the first moving plate 130.

The second axle A2 of the second motor M2 passes through the fixing portion F' of the first moving plate 130 and the second connecting portion F2 of the second moving plate 150 in a direction parallel to the Y-axis, and is fixed on the fixing portion F'. Because the second axle A2 and inner surfaces of the through holes of the second connecting portion F2 comprise threads, the second axle A2, rotated by the second motor M2, spins to move the second connecting portion F2 thereon, and allows the second moving plate 150 to move relatively to the first moving plate 130 along the Y-axis.

The two first position members 171, at two sides of the first moving plate 130, respectively pass through the first corresponding position portion 130A of the first moving plate 130 and the first position portion 111A of the connecting base 111 along a direction parallel to an X-axis, and are fixed on the first position portion 111A. In other words, the first moving plate 130 is fixed on the connecting base 111 via the first position members 171. However, the second corresponding position portion 150B is still able to move on the second position member 172, allowing the first moving plate 130 to move relatively to the connecting base 111.

The first axle A1 of the first motor M1 passes through the fixing portion F of the connecting base 111 and the first connecting portion F1 of the first moving plate 130 in a direction parallel to the X-axis, and is fixed on the fixing portion F. Because the first axle A1 and inner surfaces of the through holes of the first connecting portion F1 comprise threads, the first axle A1, rotated by the first motor M1, spins to move the first connecting portion F1 thereon, and allows the first moving plate 130 to move relatively to the connecting base 111 along the X-axis.

Referring to FIGS. 4A-4E, FIGS. 4A-4E are front views showing different operations of the aiming device of the invention. When the aiming device 100 is assembled, the point of aim of the crosshair C aligns on the optical axis of the erector tube assembly 110 (as shown in FIG. 4), which is suitable for a regular shooting range.

Figure 4A:
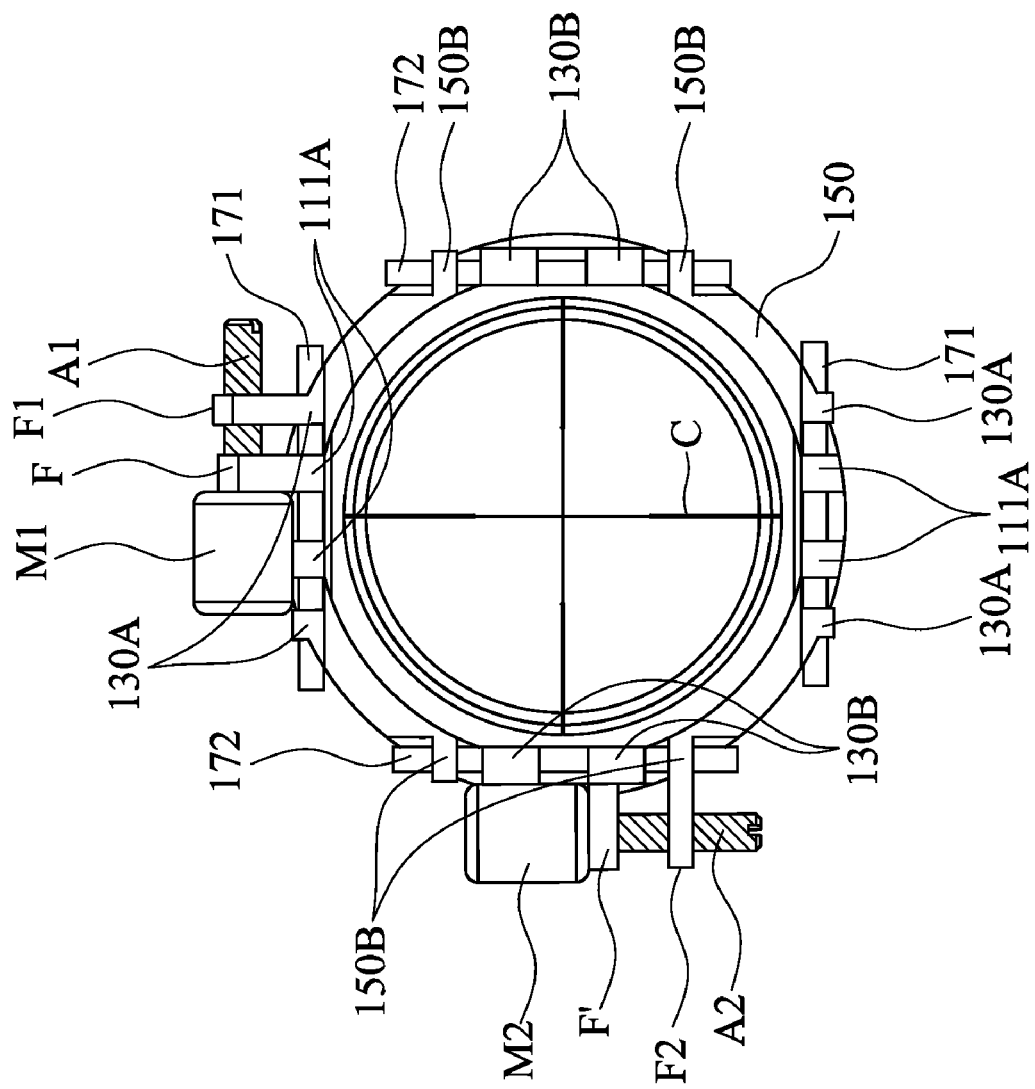
FIGS. 4A-4E are front views showing different operations of the aiming device in FIG. 3A.
Figure 4B:
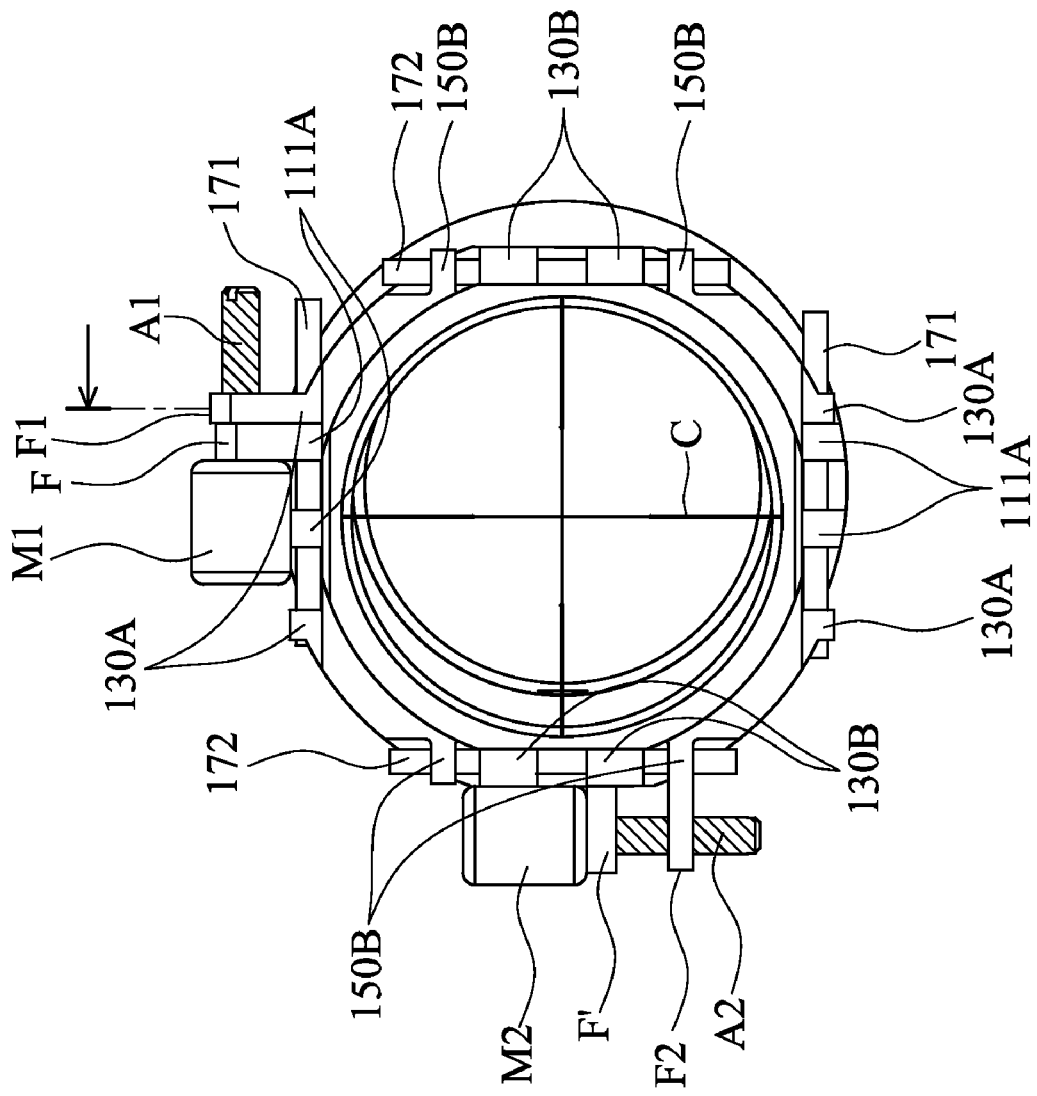
Figure 4C:
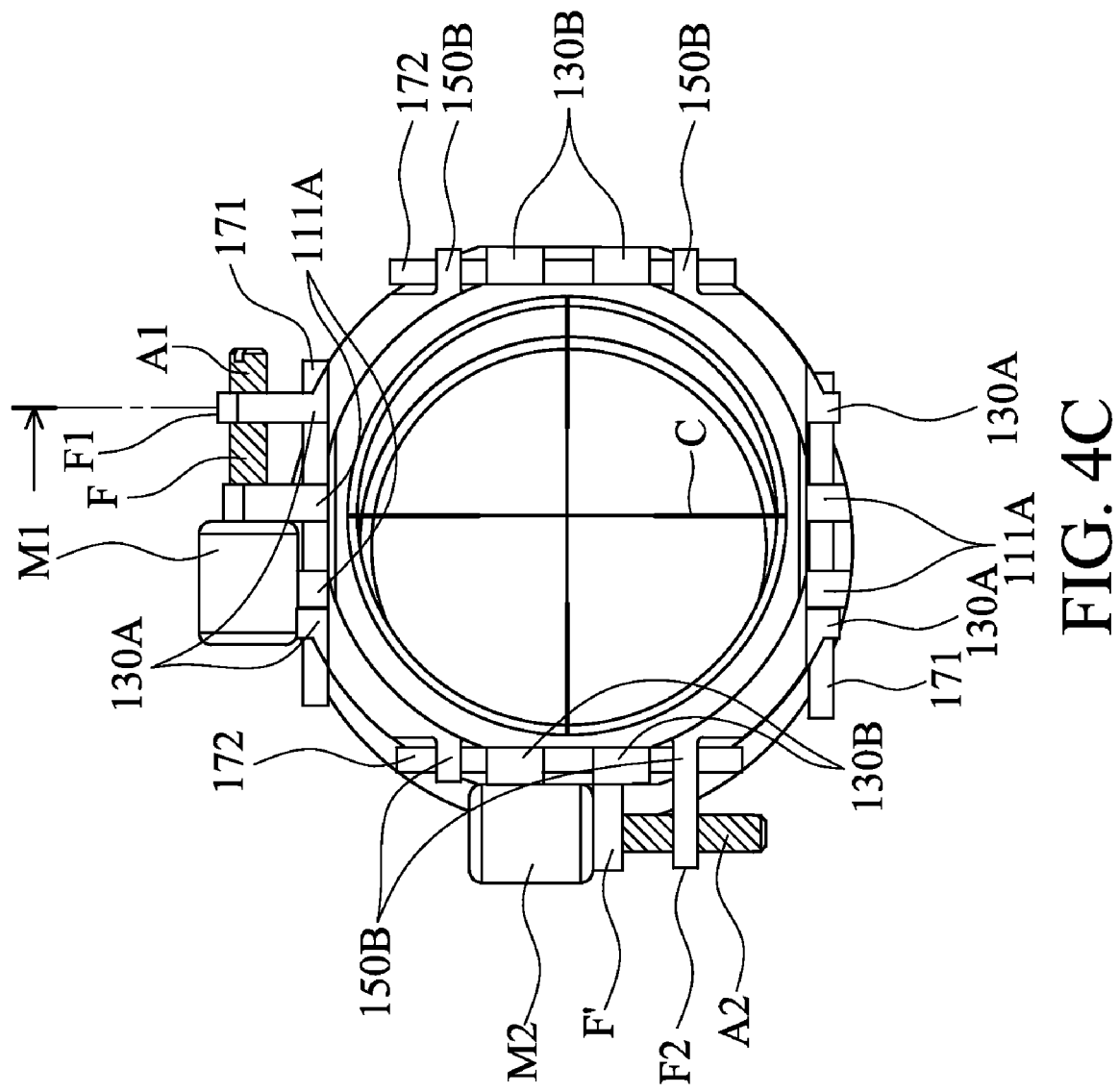

Referring to FIGS. 4B and 4C, the first motor M1 is activated to rotate the first axle A1, allowing the first connecting portion F1 to move left (as shown in FIG. 4B) and right (as shown in FIG. 4C) on the first axle A1. By moving of the first connecting portion F1, the first moving plate 130 moves relatively to the erector tube assembly 110 along the X-axis. In addition, the first moving plate 130 moves the second moving plate 150 and the crosshair C disposed thereon to change the point of aim of the crosshair C on the X-axis, compensating for windage, wherein the transverse deflection of a projectile is adjusted due to wind effects.

Figure 4D:
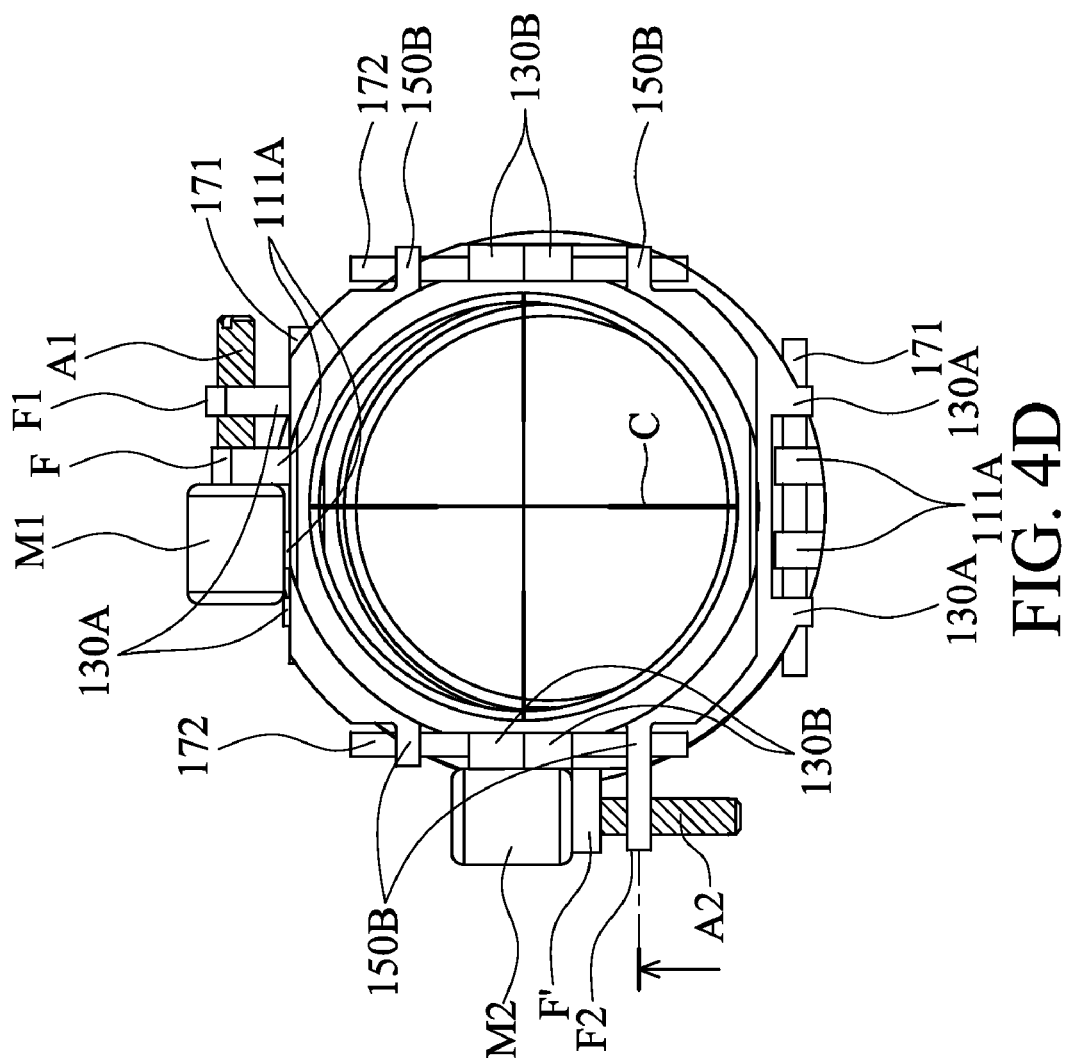
Figure 4E:
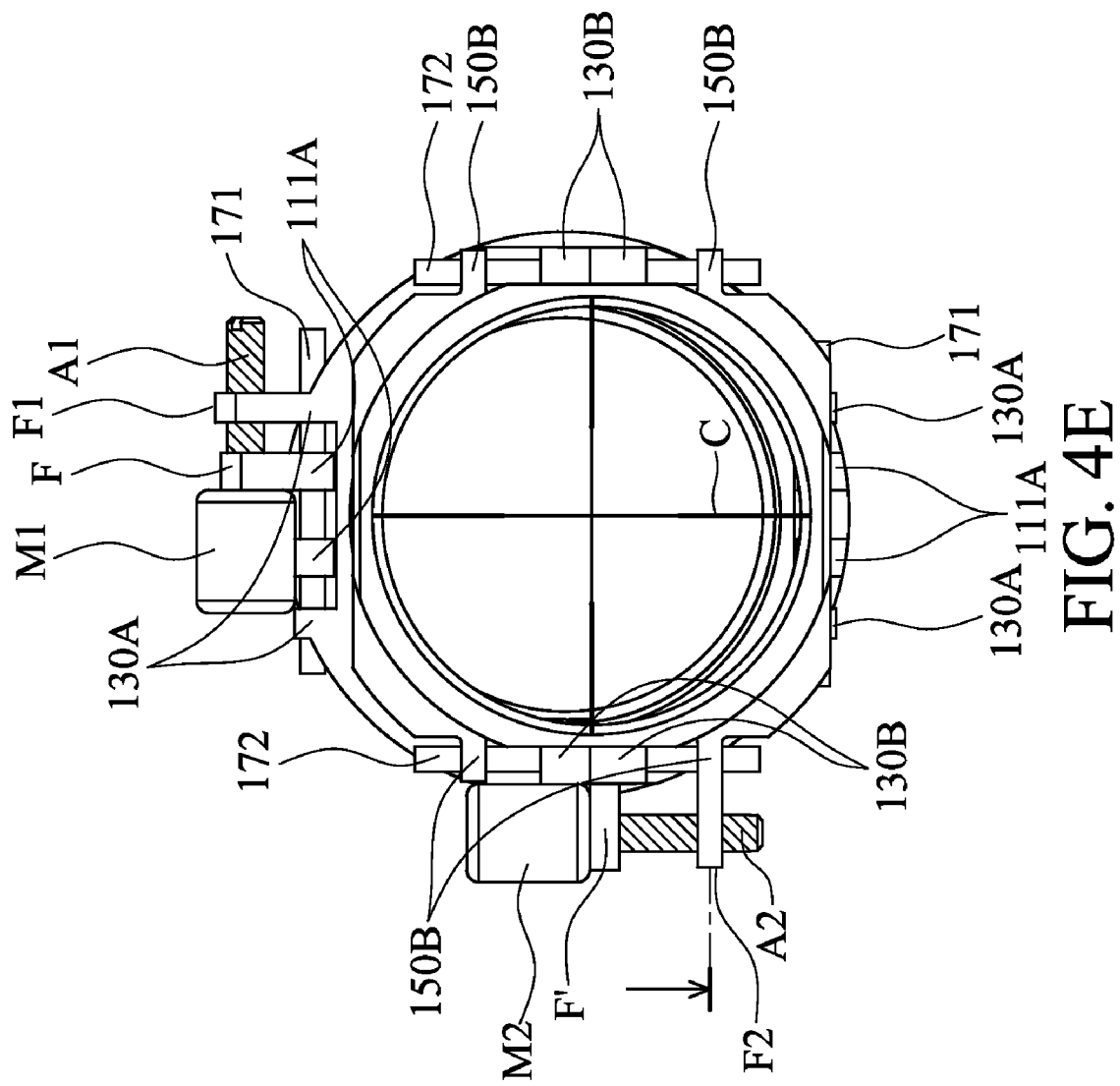

Referring to FIGS. 4D and 4E, the second motor M2 is activated to rotate the second axle A2, allowing the second connecting portion F2 to move up (as shown in FIG. 4D) and down (as shown in FIG. 4E) on the second axle A2. By moving the second connecting portion F2, the second moving plate 150 moves relatively to the first moving plate 130 along the Y-axis. In addition, the second moving plate 150 moves the crosshair C disposed thereon to change the point of aim of the crosshair C on the Y-axis, compensating for windage, wherein the vertical deflection of a projectile is adjusted due to bullet drop.

It should be noted that in the embodiment, the moving assembly of the aiming device 100 comprises the first moving plate 130 and the second moving plate 150. By moving the first moving plate 130 or the second moving plate 150, the position of the crosshair C on the X-axis and the Y-axis is changed. However, it is not limited thereto, the aiming device 100 may comprise only one moving plate moving along the X-axis or the Y-axis relatively to the erector tube assembly, and the crosshair C can be directly disposed on the moving plate. When the moving plate moves, the crosshair would be moved thereby along the X-axis or the Y-axis.

The aiming device 100 of the invention incorporates motors into the moving plates, which helps automatically adjust the position of the crosshair C, enhancing firing accuracy of the aiming device. Moreover, the point of aim of the crosshair C is able to move within the housing, such that aiming dots on the crosshair of conventional aiming devices can be eliminated, simplifying manufacturing process and saving costs.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An aiming device, comprising
   an erector tube assembly;
   a first moving plate, disposed on the erector tube assembly, moving along a first direction;
   a second moving plate, disposed on the first moving plate, moving along a second direction; and
   a crosshair disposed on the second moving plate,
   wherein when the first moving plate or the second moving plate moves, the crosshair moves with the first moving plate along the first direction or moves with the second moving plate along the second direction,
   wherein the connecting base comprises a first position portion, the first moving plate comprises a first corresponding position portion, and the aiming device further comprises a first position member, and the first position member, passing the first position portion and the first corresponding position portion, is fixed on the first position portion, and the first corresponding position portion moves on the position member.

2. The aiming device as claimed in claim 1, further comprising a first motor disposed on the erector tube assembly, wherein the first motor comprises a first axle connected to the first moving plate.

3. The aiming device as claimed in claim 2, wherein the erector tube assembly comprises a connecting base, and the first moving plate and the first motor are disposed on the connecting base.

4. The aiming device as claimed in claim 2, wherein the first moving plate comprises a first connecting portion, and the first axle passes through the first connecting portion, when the first motor is activated to rotate the first axle, allowing the first connecting portion to move on the first axle, and the first moving plate to move along with the first connecting portion.

5. The aiming device as claimed in claim 1, wherein the first direction is parallel to a Y-axis or an X-axis.

6. The aiming device as claimed in claim 1, wherein the first direction is perpendicular to the second direction.

7. The aiming device as claimed in claim 2, further comprises a second motor disposed on the first moving plate, wherein the second motor comprises a second axle connected to the second moving plate.

8. The aiming device as claimed in claim 1, wherein the first moving plate comprises a second position portion, the second moving plate comprises a second corresponding position portion, and the aiming device further comprises a second position member, and the second position member, passing through the second position portion and the second corresponding position portion, is fixed on the second position portion, and the second corresponding position portion moves on the second position member.

9. An aiming device, comprising
an erector tube assembly;
a first moving plate, disposed on the erector tube assembly, moving along a first direction;
a second moving plate, disposed on the first moving plate, moving along a second direction; and
a crosshair disposed on the second moving plate, wherein when the first moving plate or the second moving plate moves, the crosshair moves with the first moving plate along the first direction or moves with the second moving plate along the second direction;
a first motor disposed on the erector tube assembly, wherein the first motor comprises a first axle connected to the first moving plate; and
a second motor disposed on the first moving plate, wherein the second motor comprises a second axle connected to the second moving plate.

* * * * *